(No Model.)
N. STANLY.
SPRING ROLLER ATTACHMENT FOR SEED PLANTERS.
No. 261,638. Patented July 25, 1882.
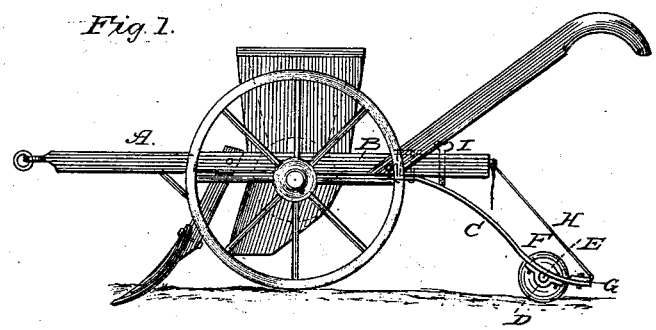
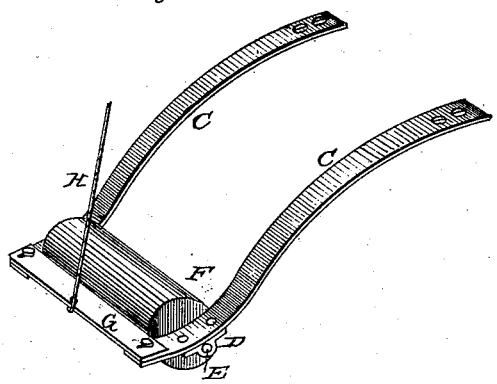
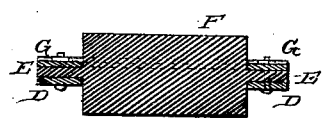
WITNESSES:
INVENTOR.
Nathan Stanly,
by C. H. Snow & Co.
ATTORNEYS.

UNITED STATES PATENT OFFICE.

NATHAN STANLY, OF KINSTON, NORTH CAROLINA.

SPRING-ROLLER ATTACHMENT FOR SEED-PLANTERS.

SPECIFICATION forming part of Letters Patent No. 261,638, dated July 25, 1882.

Application filed May 29, 1882. (No model.)

*To all whom it may concern:*

Be it known that I, NATHAN STANLY, of Kinston, in the county of Lenoir and State of North Carolina, have invented certain new and useful Improvements in Spring-Roller Attachments for Seed-Planters; and I do hereby declare that the following is a full, clear, and exact description of the invention, which will enable others skilled in the art to which it appertains to make and use the same, reference being had to the accompanying drawings, which form a part of this specification.

Figure 1 is a side view of a cotton-seed planter having my improved spring-roller attachment. Fig. 2 is a perspective view of the latter detached from the planter, and Fig. 3 is a sectional view longitudinally through the roller.

Corresponding parts in the several figures are denoted by like letters of reference.

This invention relates to an improved spring-roller attachment for seed-planters; and it consists in certain improvements in the construction and arrangement of the same, which will be hereinafter fully described, and particularly pointed out in the claim.

In the drawings hereto annexed, I have shown my invention attached to an ordinary cotton-seed planter, of which A represents the frame, to the side beams of which, B B, strong flat springs C C are attached, extending rearwardly and downwardly, as shown. The springs C, which are securely bolted to the frame-beams B, are provided near their lower ends with boxes D, bolted or otherwise secured either to their upper or under sides, and forming bearings for a shaft, E, carrying a roller, F. The lower ends of the springs C are connected by a transverse bar or plate, G, the upper edge of which bears against the roller F and forms a scraper, by which any dirt which may adhere to said roller is removed.

H is a cord or chain secured to the transverse scraper-bar G, and capable of being attached to the frame of the planter, so as to raise the roller and sustain it at the desired height.

I represents set-screws, two of which are fitted in the frame-beams, so as to bear with any desired pressure upon the springs C, and thus regulate the tension of the latter.

The operation of my invention will be readily understood from the foregoing description, taken in connection with the drawings hereto annexed. It is simple, durable, inexpensive, and capable of being attached to and used in combination with any ordinary planter. It may be manufactured of any material or combination of materials which may be deemed serviceable.

Having thus described my invention, I claim and desire to secure by Letters Patent of the United States—

The combination, with the frame of a seed-planter, of the springs C C, secured to the sides of the same, and provided near their lower ends with boxes D D, the shaft E, journaled in said boxes and having roller F, the plate or scraper G, connecting the springs C in rear of the roller, the set-screws I, arranged in the frame-beams and bearing against the springs C, and the chain H, all arranged and operating substantially as set forth.

In testimony that I claim the foregoing as my own I have hereto affixed my signature in presence of two witnesses.

NATHAN STANLY.

Witnesses:
C. F. HARVEY,
N. L. COLLAMER.